United States Patent [19]
Kato et al.

[11] 3,801,439
[45] Apr. 2, 1974

[54] DEVICE FOR DETECTING THE OVERHEATING OF FUEL ELEMENTS FOR A NUCLEAR REACTOR

[75] Inventors: Hidemasa Kato, Sagamihara; Kiyoshi Inour, Tokyo; Munemaro Imai, Machida, all of Japan

[73] Assignee: Hitachi, Ltd., Tokyo, Japan

[22] Filed: Oct. 27, 1970

[21] Appl. No.: 84,423

[30] Foreign Application Priority Data

Oct. 31, 1969 Japan ........................ 44-86859

[52] U.S. Cl. .......................................... 176/19 R
[51] Int. Cl. .......................................... G21c 17/02
[58] Field of Search .................................. 176/19 R

[56] References Cited

UNITED STATES PATENTS

| | | | |
|---|---|---|---|
| 3,234,100 | 2/1966 | Ogle | 176/19 R |
| 3,165,446 | 1/1965 | Untermyer | 176/19 R |
| 3,350,271 | 10/1967 | Maidment et al. | 176/19 R |
| 3,240,674 | 3/1966 | Ledwidge | 176/19 R |
| 3,411,987 | 11/1968 | Fitzpatrick | 176/19 R |
| 3,418,207 | 12/1968 | Becker et al. | 176/19 R |

FOREIGN PATENTS OR APPLICATIONS

| | | | |
|---|---|---|---|
| 1,002,625 | 8/1965 | Great Britain | 176/19 R |

*Primary Examiner*—Reuben Epstein
*Attorney, Agent, or Firm*—Craig and Antonelli

[57] ABSTRACT

A device for detecting the overheating of fuel elements in a nuclear reactor of such a type that liquid coolant is allowed to flow through space among a number of fuel elements inserted into the core of the reactor, in which a particular fuel element is provided with a cylindrical or planar septum with a slight interstice therebetween. When the particular fuel element is abnormally overheated, the overheating is detected by detecting the filmy boiling of the coolant flowing in the interstice around the particular element which occurs before the filmy boiling of the coolant flowing in the space around the other fuel elements occurs.

6 Claims, 5 Drawing Figures

4 2 1 3 5
6 6 6 6
10
9
7 8

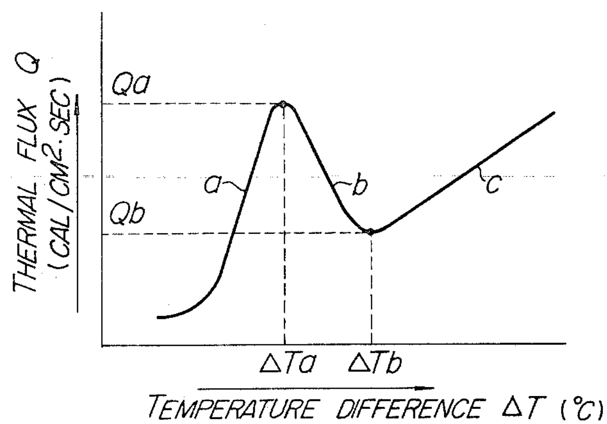
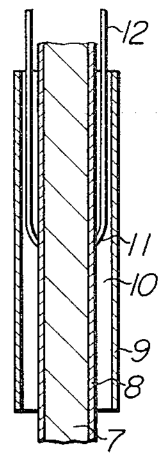
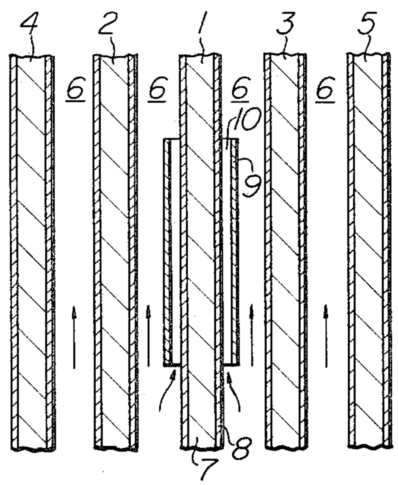
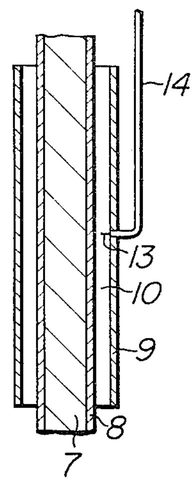
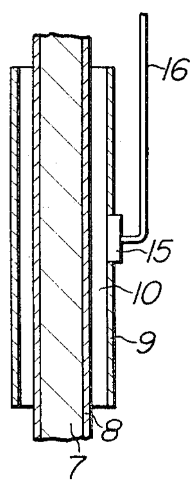
INVENTORS
HIDEMASA KATO, KIYOSHI INOUE AND MUNEMARO IMAI
BY Craig, Antonelli, Stewart & Hill
ATTORNEYS

DEVICE FOR DETECTING THE OVERHEATING OF FUEL ELEMENTS FOR A NUCLEAR REACTOR

BACKGROUND OF THE INVENTION

1. Field of the Invention

This invention relates to a device for preventing damages of fuel elements in a nuclear reactor core, and more particularly to a device for detecting abnormal overheating of fuel elements, which is a main cause of damages of the fuel elements, before such damage can occur.

2. Description of the Prior Art

In order to operate a nuclear reactor safely and economically, it is necessary to prevent the rupture of fuel elements in the core of a nuclear reactor. To achieve this object, some means must be provided which accurately detects the occurrence of abnormal phenomena causing the rupture of the fuel element to immediately provide the necessary measure for preventing the rupture of the fuel element.

The damage of the fuel element in the core of a nuclear reactor is mainly caused by the overheating of the fuel elements and the overheating of the fuel element is caused by the excessive self-heating of the fuel element and/or the reduction of the cooling ability of the coolant around the fuel element. Accordingly, overheating of the fuel element can be detected by some method for preventing the breakdown of the fuel element.

The following methods of detection have so far been proposed. According to a first method, a core of a nuclear reactor is composed such that a specified fuel element can give rise to a particularly larger self-heating than the other fuel elements and the rupture of the specified fuel element, which is to occur prior to the rupture of the others, is detected.

According to a second method, the cooling power of the coolant around a specified fuel element in the core of a reactor is made smaller than that of the coolant around the other fuel elements so that the above specified fuel element ruptures prior to the other elements and the rupture of the specified fuel element is detected.

The conventional methods described above, however, suffer from the disadvantage that the specified fuel element actually ruptures.

SUMMARY OF THE INVENTION

This invention is intended to obviate the deficiency described above and an object of this invention is to provide a device for surely detecting abnormal overheating of fuel elements, which causes rupture of the fuel elements, without actually damaging any fuel element inserted into the core of a nuclear reactor.

In order to achieve this object, the invention provides a septum around at least specified one of a number of fuel elements inserted into a core of a nuclear reactor with a slight interstice therebetween and a means for detecting the filmy boiling of coolant flowing through the interstice, whereby, when the fuel elements are abnormally overheated, the abnormal heating which is a cause of the rupture of the fuel elements is detected before the rupture occurs to prevent the rupture of the fuel elements by detecting the filmy boiling which occurs prior to the occurrence of the filmy boiling of the coolant flowing through the gaps among the remaining fuel elements.

BRIEF DESCRIPTION OF THE DRAWING

FIG. 1 is a graph showing the characteristics of a coolant in a reactor core in the boiling process.

FIG. 2 is a longitudinal sectional view of a main part of a reactor core illustrating the principle of the composition of a device according to this invention.

FIG. 3 is a longitudinal sectional view of the structure of a main part of an embodiment of this invention.

FIG. 4 is a longitudinal sectional view of the structure of a main part of another embodiment of this invention.

FIG. 5 is a longitudinal sectional view of the structure of main part of a further embodiment of this invention.

DESCRIPTION OF THE PREFERRED EMBODIMENTS

Description will first be made of the principle of this invention.

An observation of the boiling process of a coolant in a nuclear reactor core indicates characteristics as shown in FIG. 1. The curve in FIG. 1 shows the relationship between the thermal flux Q released from the surface of the covering tube of a fuel element into the coolant and the temperature difference $\Delta T( = T_w - T_s)$ between the surface temperature $T_w$ of the covering tube and the saturated boiling temperature $T_s$ of the coolant.

The curve has a maximum value $Q_a$ at a point $\Delta T = \Delta T_a$ and a minimum value $Q_b$ at $\Delta T = \Delta T_b$. The region *a* where $\Delta T$ is smaller than $\Delta T_a$, is called a nuclear boiling part. In this region, voids caused by the boiling of the coolant are mixed in the coolant and the cooling power of the coolant is at a maximum. The region *b* of $\Delta T$ between $\Delta T_a$ and $\Delta T_b$ is called a transition boiling part. In this region, a film of void begins to be formed at a part of the surface of a covering tube and thus the cooling effect beomes unstable. The region *c* of $\Delta T$ larger than $\Delta T_b$ is called a filmy boiling part. In this region, the entire surface of the covering tube is covered by a film of void having a low thermal conductivity and the cooling power of the coolant drops rapidly. As a result, an abnormal overheating of the fuel element occurs and the fuel element (particularly its covering tube) is ruptured.

As is evident from the above consideration, the rupture of a fuel element does not occur until $\Delta T$ becomes large in the filmy boiling part *c*. In other words, the filmy boiling of the coolant around the fuel element necessarily occurs before the fuel element is ruptured by overheating.

This invention is based on this fact and the abnormal overheating causing the rupture of a fuel element is detected by detecting the occurrence of the filmy boiling described above.

Further, in order to prevent all the fuel elements from falling into such an abnormal overheated state when some abnormal condition occurs, this invention employs a method, in which the filmy boiling of the coolant around a specified fuel element in a reactor core is forced to occur before the filmy boiling of the coolant around the remaining fuel elements occurs.

Accordingly, the device of this invention comprises a means for causing the filmy boiling of the coolant around a specified fuel element in the core before the occurrence of the filmy boiling of the coolant around the remaining fuel elements and a means for detecting the occurrence of the filmy boiling.

The construction of the embodiments of this invention will now be described with reference to the accompanying drawings.

FIG. 2 shows the principle of the construction of a device according to this invention, in which equally spaced fuel elements 1, 2, 3, 4 and 5 are inserted into a reactor core. A flow path 6 for the coolant is formed in the gaps between the fuel elements and a coolant (such as light water) is made to flow therethrough in a direction indicated by the arrows. Each fuel element is made by sealing a fuel material 7 such as $UO_2$ in a metal covering tube 8. Thus, the heat generated by the fuel material 7 during the operation of a nuclear reactor is released into the coolant through the covering tube 8.

In this invention, a cylindrical (or planer) septum 9 is provided around a specified fuel element (fuel element 1 in FIG. 2) in the reactor core, and an interstice 10 is formed between the covering tube 8 and the septum 9. The coolant introduced around the specified fuel element 1 is divided into the inner and outer flows relative to the septum 9 as indicated by the arrows. Since the septum 9 prevents mixing motion in the transverse direction perpendicular to the direction of flow) of the coolant around the specified fuel element 1, the void generated at the surface of the covering tube 8 is likely to remain fixed to the surface of the covering tube 8. Therefore, when the fuel elements in the reactor core are abnormally overheated, the filmy boiling occurs first in the coolant flowing through the interstice 10. At the time when this first filmy boiling occurs, only the specified fuel element described above is in an overheated state and most of the other fuel elements are in a sufficiently safe state. Accordingly, if the filmy boiling occurring in the interstice 10 is detected and a measure for preventing the rupture of the fuel element, such as the reduction of a reactor power, is taken immediately, the rupture of all the fuel elements, including the specified fuel element 1, can be avoided.

The filmy boiling in the interstice 10 is detected in the following manner in this invention.

Since the temperature of the specified fuel element 1 described above rises rapidly when filmy boiling begins to occur in the interstice 10, the occurence of the filmy boiling can be detected by monitoring the temperature of the fuel element 1. FIG. 3 shows an embodiment of such a device which measures and monitors the surface temperature of the part of the covering tube 8 covered by the septum 9 by using a thermocouple 11 having lead wires 12.

Since the electric resistance of the coolant flowing through the interstice 10 rises rapidly when the filmy boiling occurs, the occurence of the filmy boiling can also by detected by measuring and monitoring the change in the resistance of the coolant. FIG. 4 shows an embodiment for this purpose which measures and monitors the electric resistance between the covering tube 8 and a needle electrode 13 provided approximately at the center of the inner surface of the septum 9 in opposing relationship to the covering tube 8 through lead wires 14.

Further, since a rapid change in pressure occurs in the coolant flowing through the interstice 10 when the filmy boiling occurs therein, the occurrence of the filmy boiling can also be detected by monitoring the change in the pressure. FIG. 5 shows an embodiment for this purpose which comprises an acoustic wave detector 15 at the center of the inner wall of the septum 9 and which detects the pressure wave generated at the time of the occurrence of the filmy boiling. The output from the detector 15 is derived from the reactor core through lead wires 16.

Detection of the filmy boiling in the interstice 10 can further be accomplished by directly observing the occurrence of a void film at the surface of the covering tube 8 by using an optical device such as a periscope.

We claim:

1. In a nuclear reactor in which a liquid coolant is made to flow through gaps among a number of fuel elements inserted into the reactor core, a device for detecting overheating of a fuel element comprising a septum arranged around and spaced from one of said fuel elements with a slight interstice for providing a coolant flow path in which filmy boiling of the coolant occurs prior to the occurrence of filmy boiling of the coolant in any other flow path defined by the gaps between said fuel elements when said fuel elements are overheated, said fuel elements other than said fuel element disposed within said septum being disposed outside of said septum, and means for detecting filmy boiling of the coolant flowing through the interstice between said septum and said one fuel element.

2. A device according to claim 1, comprising a plurality of septums, said plurality of septums being substantially less in number than the number of fuel elements, each of said septums being arranged around and spaced from different selected ones of said fuel elements with a slight interstice between said septum and said respective fuel element.

3. A device according to claim 1, wherein said means for detecting filmy boiling comprises means for measuring the temperature of the surface of the fuel element surrounded by said septum.

4. A device according to claim 1, wherein said fuel elements are columnar and said septum is cylindrical.

5. In a nuclear reactor in which a liquid coolant is made to flow through gaps among a number of fuel elements inserted into the reactor core, a device for detecting overheating of a fuel element comprising a septum provided around at least one of said fuel elements with a slight interstice therebetween and means for detecting filmy boiling of the coolant flowing through the interstice between said septum and said specified fuel element, said means for detecting filmy boiling including means for measuring the electric resistance of the coolant in said interstice.

6. In a nuclear reactor in which a liquid coolant is made to flow through gaps among a number of fuel elements inserted into the reactor core, a device for detecting overheating of a fuel element comprising a septum provided around at least one of said fuel elements with a slight interstice therebetween and means for detecting filmy boiling of the coolant flowing through the interstice between said septum and said specified fuel element, said means for detecting filmy boiling including means for measuring the pressure of the coolant in said interstice.

* * * * *